(12) United States Patent
Marshall

(10) Patent No.: US 8,141,929 B2
(45) Date of Patent: Mar. 27, 2012

(54) POWER OPERATED RETRACTABLE TAILGATE ASSEMBLY

(76) Inventor: Robert L. Marshall, Salem, KY (US)

(*) Notice: Subject to any disclaimer, the term of this patent is extended or adjusted under 35 U.S.C. 154(b) by 126 days.

(21) Appl. No.: 12/586,804

(22) Filed: Sep. 28, 2009

(65) Prior Publication Data

US 2010/0109368 A1    May 6, 2010

(51) Int. Cl.
B62D 25/00    (2006.01)
(52) U.S. Cl. .......................................... 296/51
(58) Field of Classification Search .............. 296/51, 296/57.1, 26.09, 26.08, 61, 180.1, 26.11, 296/37.6, 50, 62; 280/166; 224/403, 404; 414/537
See application file for complete search history.

(56) References Cited

U.S. PATENT DOCUMENTS

| | | | |
|---|---|---|---|
| 2,431,588 A | 11/1947 | Sharpe | |
| 2,852,303 A | 9/1958 | Hopson | |
| 2,872,239 A | 2/1959 | Bowness et al. | |
| 3,004,790 A | 10/1961 | Mayer | |
| 3,010,760 A * | 11/1961 | Trautmann | 296/57.1 |
| 3,695,666 A | 10/1972 | Corson | |
| 4,580,828 A * | 4/1986 | Jones | 296/57.1 |
| 4,813,842 A | 3/1989 | Morton | |
| 4,856,840 A | 8/1989 | Hanley | |
| 4,951,991 A | 8/1990 | Haigler | |
| 5,104,172 A | 4/1992 | Schildt | |
| 5,123,692 A | 6/1992 | Couvillion | |
| 5,451,089 A | 9/1995 | Bender | |
| 5,456,511 A | 10/1995 | Webber | |
| 5,468,038 A * | 11/1995 | Sauri | 296/57.1 |
| 5,518,287 A | 5/1996 | Totani | |
| 5,522,685 A | 6/1996 | Lessard | |
| 5,954,383 A | 9/1999 | Beck et al. | |
| 6,276,738 B1 * | 8/2001 | Marshall | 296/51 |
| 6,454,338 B1 * | 9/2002 | Glickman et al. | 296/26.11 |
| 6,464,278 B2 * | 10/2002 | Bailey | 296/50 |
| 7,264,292 B1 * | 9/2007 | Summers | 296/26.09 |
| 7,347,474 B2 * | 3/2008 | Shagbazyan | 296/61 |
| 7,513,552 B2 * | 4/2009 | Carvalho | 296/26.09 |
| 2009/0079217 A1 * | 3/2009 | Bakshi et al. | 296/61 |
| 2009/0273202 A1 * | 11/2009 | Heaman et al. | 296/26.09 |

* cited by examiner

Primary Examiner — Kiran B Patel
(74) Attorney, Agent, or Firm — Carrithers Law Office PLLC

(57) ABSTRACT

A power operated retractable tailgate assembly for a vehicle that includes a tailgate with opposite end edges thereof connected via sliding pivots to a respective one of a pair of elongate slide rails. The slide rails mount in lateral spaced apart relation on the underside of the floor of the cargo carrying box on the vehicle. A first extendible and retractable assembly, having relatively movable respective first and second portions, has the first portion anchored to the vehicle and a second portion that is hingedly connected to the tailgate proximate a lower marginal edge thereof. A power means is operatively connected to the extendible and retractable assembly and is operable from within the cab of the vehicle selectively to extend and retract the tailgate by moving the tailgate along the slide members. A second power operated extendible and retractable assembly is connected to the tailgate to move the same from its open position wherein it is horizontally disposed and projects rearwardly from the vehicle to a raised closed position wherein it is disposed vertically. Each of the extendable and retractable assemblies include a hydraulic cylinder unit operatively associated with a motor-driven pump. An alternate method of opening and closing the tailgate uses an electric motor directly driving a cable system which opens and closes the tailgate utilizing for example a winch unit comprising an electric motor driving a cable drum rather than the use of a screw drive or hydraulic means to control the cables.

7 Claims, 10 Drawing Sheets

POWER OPERATED RETRACTABLE TAILGATE ASSEMBLY

RELATED APPLICATIONS

This application claims priority from U.S. patent application Ser. No. 12/283,140 filed on Sep. 9, 2008 which is a Continuation application of U.S. Pat. No. 7,422,262 which issued on Sep. 9, 2008 from U.S. patent application Ser. No. 11/502,012 filed on Aug. 10, 2006 which claims priority from U.S. Provisional Application Ser. No. 60/796,636 filed on May 1, 2006 all of which are incorporated by reference in their entirety.

FIELD OF THE INVENTION

This invention relates generally to a tailgate for use on for example a pickup truck or other vehicle having box type bed and more particularly to a power operated tailgate, to a power operated retractable tailgate and to a motorized vehicle incorporating a power operated tailgate that can be actuated from within the cab of the vehicle.

DESCRIPTION OF THE PRIOR ART

Pickup trucks typically have a cargo space rearward of the cab portion of the truck. The cargo space is generally defined by a front end wall and a pair of laterally spaced apart side walls that extend vertically upwardly from a floor or "bed" of the truck. The rear wall is an open area that is selectively covered and uncovered by a tailgate moveable from one to another of a first 'closed' and a second 'open' position. The tail gate is pivotally mounted on the vehicle near the floor at the trailing end the cargo space and in the first position it is vertically disposed closing the open rear wall. The tailgate pivots downwardly to its second position wherein it is generally horizontally disposed and projects rearwardly from the trailing end of the vehicle.

Tailgates conventionally have these two basic positions the first being a tailgate vertical "up" position for forming a cargo box and the second wherein the tail gate is horizontal, i.e., "down" position in which an upper surface of the tailgate is usually coplanar with the floor. In some vehicle models the tailgate is removable.

The tailgate is usually held in the vertical "up" position by a latch mechanism such as a chain or peg in cooperative engagement with alignable loops attached to the sidewalls and tailgate or by a pair of longitudinal members on each side of the tailgate wherein a selected distal end is connected to the sidewall panel and one end is connected to the tailgate. The longitudinal members usually are joined in the center by a rivet allowing the folding of the members for nesting within the tailgate.

Although the tailgate usually remains in the up position, there are times when the user finds it advantageous to lower the tailgate such as when pulling or backing a trailer. For instance, gooseneck trailers designed for hauling heavy equipment and/or livestock have been designed for coupling to a fifth wheel attachment of a truck frame or pickup truck bed whereby a coupling post extends downward from the trailer frame providing rotational support for pulling the trailer. The length of the horizontal frame provides sufficient space between the towing vehicle for pivoting movement of the towing vehicle relative to the trailer; however, depending upon the height of the coupling post, the trailer tongue extending backward from the coupling post may hit and damage the tailgate of the truck in some positions, such as the vertical erect position. A conventional tailgate which is lowered to a general horizontal plane also interferes with the ability to turn a gooseneck or other type trailer due to its rearward protrusion. Hanging the tailgate on the bumper forming an inclined plane angled toward the ground does not eliminate the restriction in the turning radius of the trailer in that the corners of the tailgate may still contact the gooseneck or body of the trailer and cause damage to the tailgate as well.

Another situation where the tailgate interferes with the use of the vehicle is where the user is backing the pickup truck into close adjacency to a loading dock and the user's vision is obscured or when the user is hooking up to a conventional ball hitch trailer wherein the hitch ball is located on the bumper below the level of the truck bed and tailgate.

The applicant's U.S. Pat. No. 6,276,738 granted Aug. 21, 2001 and entitled 'Retractable Tailgate Assembly' is directed to a retractable tailgate permitting leaving the rear of the cargo compartment open without having the tailgate extend rearwardly from the vehicle or downwardly with respect to the cargo compartment. This is accomplished by having the tailgate mounted on the vehicle via sliding pivots allowing the tailgate to be moved from its above referred to second position to a third position wherein the tailgate is located under the floor of the cargo box of the vehicle.

The retractable tailgate assembly disclosed in the foregoing patent includes a release mechanism located within a conventional pickup truck or truck bed tailgate and a support frame for slidably retracting and holding the tailgate in-between the pickup truck bed and the frame. The retractable tailgate assembly can be incorporated into new pickup trucks or adapted to existing vehicles. The retractable tailgate does not extend beyond the bed of the truck a distance greater than a traditional original equipment manufacturer's, ("OEM")'s, tailgate and utilizes the conventional lock and pivot points of the OEM pickup truck tailgate. Other than being retractable the tailgate generally looks and performs as a conventional OEM tailgate so that it can be sat upon and used in the conventional manner; however, the lowering and retraction of the tailgate permits use of the vehicle with a gooseneck trailer attached to the fifth wheel of the pickup without the tailgate interfering with the turning radius or being damaged by the gooseneck trailer extension.

The retractable tailgate mounting assembly includes a tailgate support frame that is disposed under the truck cargo bed with one end being connected to the vehicle and the other end to the tailgate and a pair of elongate support members with each having an open faced channel slidably receiving therein a pivot pin projecting from an adjacently disposed edge of the tailgate. A release mechanism mounts on or alternatively is located within the tailgate for disengaging the tailgate pivot pins from a pin receiving recess in the vehicle structure or elongate support structure.

The retractable tailgate in applicants above referred to patent has to be manually moved from one to the other of its variously assumable positions.

A principal object of the present invention is to provide a power operated tailgate and a vehicle that incorporates the same.

An object of the present invention is to provide a power means connected to the tailgate for closing the same.

An object of the present invention is to provide a tailgate with power means connected thereto for moving the tailgate from one to the other of its second and third positions. Power means for moving the tailgate to and from its second and third position include hydraulic means, worm drive means, and electric motor driven cable means.

A principal object of the present invention is to provide a motorized vehicle that incorporates a power operated tailgate that can be actuated by controls located within the cab of the vehicle.

SUMMARY OF THE INVENTION

The power operated tailgate of the present invention is application to pick up trucks having a bed and tailgate or other vehicles such as sport utility vehicle, dump truck, or the like which utilize a box type bed having a tailgate. The present invention shall be described as being used on a pick up truck; however, its utility is not limited to pick up trucks and is adaptable to skid mounted beds attached to tractors by three point hitch assemblies as well as beds having tailgates provided with other vehicles.

In keeping with the foregoing there is provided in accordance with the present invention a motor vehicle tailgate assembly comprising: a tailgate; a pair of elongate slide members mountable in lateral spaced apart relation on the vehicle; sliding pivot means interconnecting opposite ends of the tailgate with a respective one of the pair of elongate members, the pivot means being disposed proximate a lower marginal edge of the tailgate and slidable longitudinally along the elongate members; a first extendible and retractable assembly having relatively movable respective first and second portions with the first portion anchorable to the vehicle and the second portion being hingedly connected to the tailgate proximate a lower marginal edge thereof; and power means connected to the first assembly and operable selectively to extend and retract the same and thereby move the tailgate back and forth longitudinally along the slide members.

In accordance with a further aspect of the present invention there is provided a motor vehicle tailgate assembly comprising a tailgate, a pair of elongate slide members mountable in lateral spaced apart relation on the vehicle, and a sliding pivot means interconnecting opposite ends of the tailgate with a respective one of the pair of elongate members. The pivot means are disposed proximate a lower marginal edge of the tailgate and slidable longitudinally along the elongate slide members. A first extendible and retractable assembly has relatively movable respective first and second portions with the first portion anchorable to the vehicle and the second portion being hingedly connected to the tailgate proximate a lower marginal edge thereof. A second extendible and retractable assembly having relatively movable respective first and second portions with the first portion anchorable to the vehicle and the second portion being connected to the tailgate to pivot the same on the sliding pivots moving the tailgate from a horizontal position where it projects rearwardly from the vehicle to a vertical closed position. Power means are connected to the first and second assemblies and operable selectively to extend and retract the same and thereby move the tailgate back and forth longitudinally along the slide members and pivot the same from a horizontal position to a vertical position.

More particularly a motor vehicle tailgate assembly consists essentially of a tailgate, a pair of elongate slide members mountable in lateral spaced apart relation on the vehicle, and a sliding pivot means interconnecting opposite ends of the tailgate with a respective one of the pair of elongate members. The pivot means are disposed proximate a lower marginal edge of the tailgate and slidable longitudinally along the elongate slide members. A first extendible and retractable assembly has relatively movable respective first and second portions with the first portion anchorable to the vehicle and the second portion being hingedly connected to the tailgate proximate a lower marginal edge thereof. A second extendible and retractable assembly having relatively movable respective first and second portions with the first portion anchorable to the vehicle and the second portion being connected to the tailgate to pivot the same on the sliding pivots moving the tailgate from a horizontal position where it projects rearwardly from the vehicle to a vertical closed position. Power means are connected to the first and second assemblies and operable selectively to extend and retract the same and thereby move the tailgate back and forth longitudinally along the slide members and pivot the same from a horizontal position to a vertical position.

Another preferred embodiment utilizes a power unit means for the cable system which opens and closes the tailgate is a winch unit comprising an electric motor 210 driving a cable drum 200 rather than the use of a screw drive or hydraulic means to control the cables.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the several views and wherein.

DETAILED DESCRIPTION OF THE PREFERRED EMBODIMENT

Figure 1:
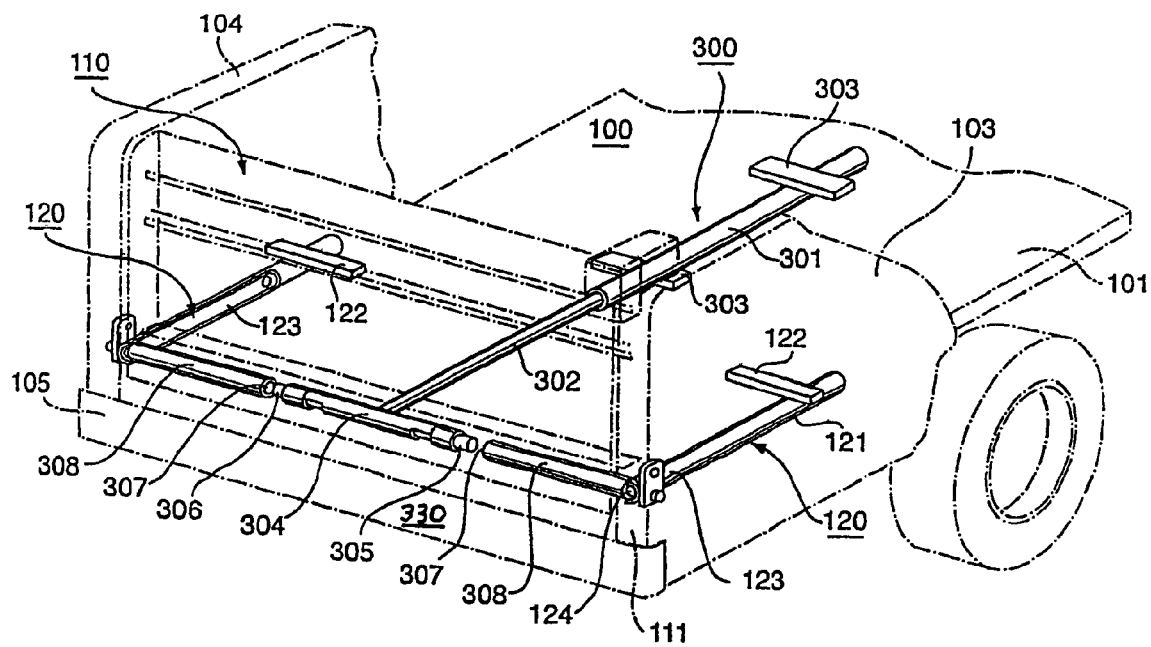
FIG. 1 is a perspective view showing the rear portion of a pick up truck and a retractable tailgate assembly with the tailgate in the raised vertical position and connected to power unit for moving it from one to the other of an extended and a retracted position.

FIG. 1 is similar to the pick-up truck retractable tailgate disclosed in applicants aforementioned U.S. Pat. No. 6,276,738 and differs therefrom by having remotely actuated power means to move the tail gate from one to the other of it's second (horizontal) position and third (retracted) position. Illustrated in FIGS. 3-7 is a first power unit that is connected to the tailgate to move it from its horizontal second position to it's vertical first position, and a second power unit to move the tail gate from one to the other of it's second (horizontal) position and it's third (retracted) position. It is to be understood that a vehicle may incorporate one or the other or both of the power units and may constitute an assembly for retrofitting a vehicle or incorporated during manufacture of the vehicle.

Referring to the drawings there is illustrated the back portion of a pick up truck comprising a cargo area 100 defined by a floor 101, a front wall 102 and a pair of laterally spaced apart side walls 103, 104. The truck is shown by broken lines and includes a rear bumper 105.

A tailgate 110 mounts on the truck by a pair of sliding pivot units 120 whereby the tailgate can be retracted under the bed of the truck box as more fully disclosed in applicant's aforementioned U.S. Pat. No. 6,276,738 the substance of which is incorporated herein by reference thereto. Each sliding pivot 120 includes an elongate slide rail 121 that attaches to the underside of the cargo bed as by one or more attachment members 122. Each slide rail has an elongate open faced channel 123 receiving therein a pin 124 projecting outwardly from the adjacent edge of the tailgate. The pivot pins are disposed at a location proximate the lower edge of the tail gate and may have a roller journalled thereon for rolling engagement in the channel. Alternatively the pivot pins can project into a hole or recess in respective ones of a pair of blocks slidably disposed in a respective one of the channels or the blocks may slidably embrace the elongate slide rails in which case the channels need not be present. The blocks may be made of, or at least have a surface thereof in sliding contact with the elongate member, a friction reducing wear resistant material. The pivot pins may be spring loaded to facilitate assembly/disassembly or alternatively fixedly secured to the tail gate.

The tailgate elongate members are located proximate a respective one of the laterally spaced apart side walls defining the cargo box and may be secured to the frame of the vehicle or alternatively and preferably the panels that define the truck box for example directly or via brackets to the underside of the floor and/or panels defining the side walls of the cargo box.

Pivotal movement of the tail gate is preferably limited to an arc of 90 degrees by for example one or the other or both power units connected thereto to move the same to and from its various assumable positions or hard points in pivotal connections of or to the tail gate.

Figure 2:
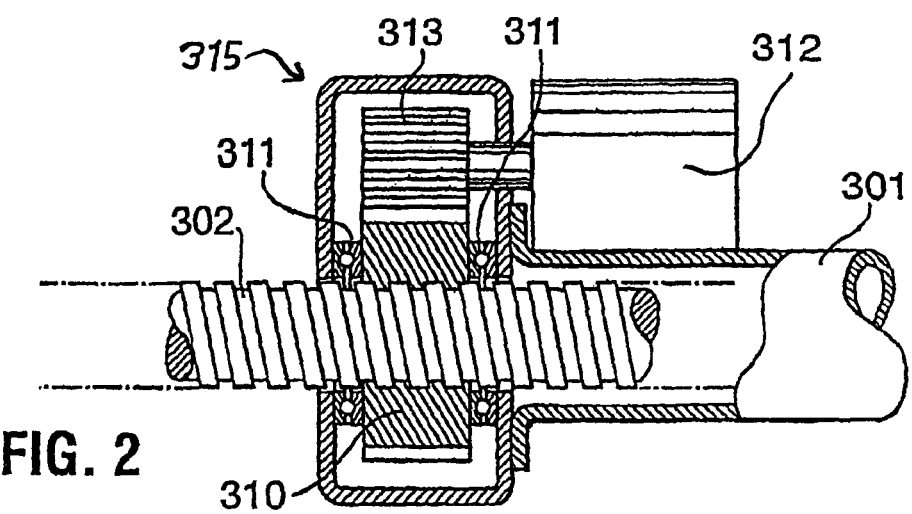
FIG. 2 diagrammatically and partial section illustrates a drive means for the extendible and retractable unit connected to the tail gate.
Figure 3:
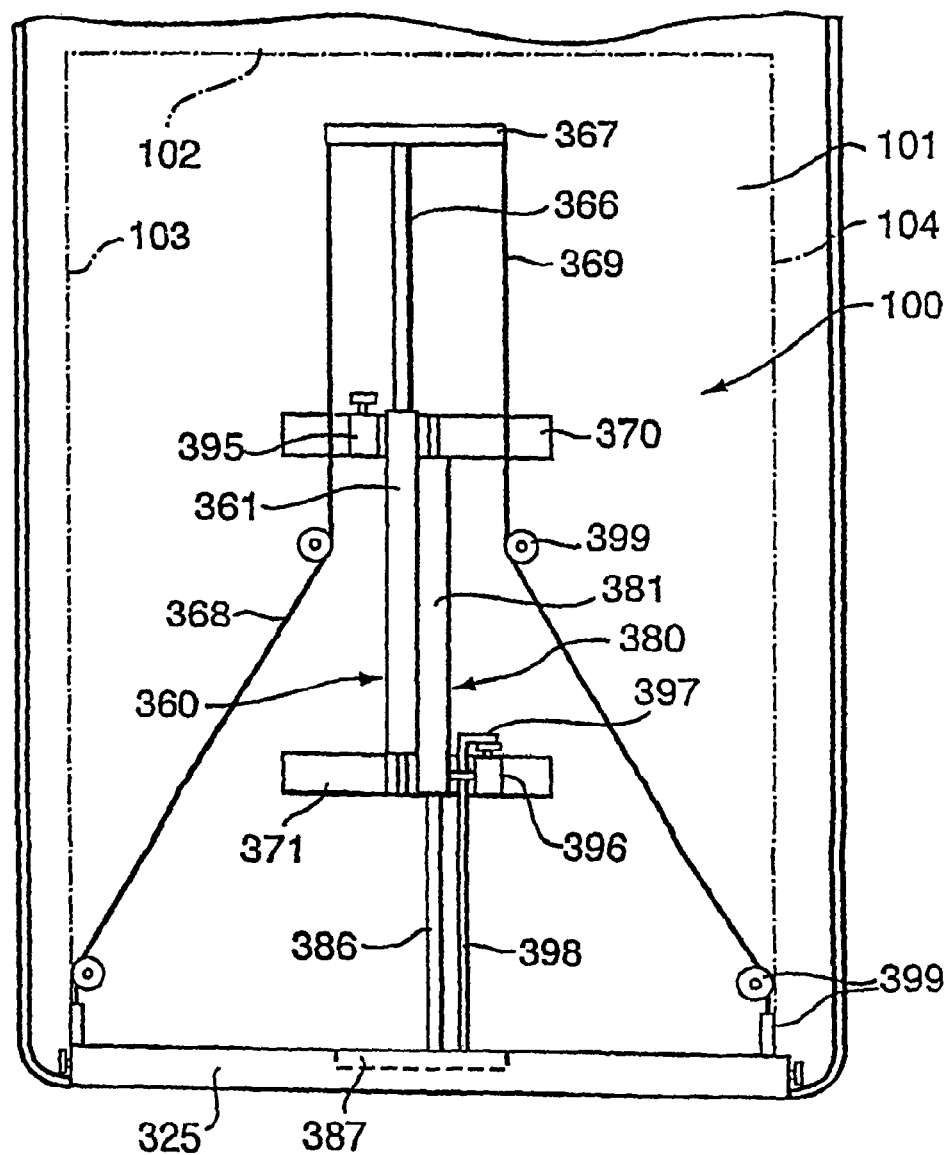
FIG. 3 is a diagrammatic top view with portions of the vehicle box removed for clarity of illustration and in which the tailgate is in an upright closed position and connected to first and second power units to move it from one position to another.

Remotely operable power units are connected to the tail gate to move it from one of its various assumable positions to another. The power means for moving the tailgate 110 diagrammatically illustrated in FIGS. 3-7 includes a first power unit for moving the tail gate from its second (the horizontal open position), to its first (up or 'closed' position), and a second power unit that moves it from one to the other of its second position and a third position where the tail gate is retractable under the floor of the cargo box. In FIGS. 1 and 2 only the second unit is shown and which may alternatively employ a screw jack type unit.

Referring to FIGS. 1 and 2, the extendible and retractable unit has a first portion 301 that can be securely fastened to the underside of the floor 101 and a second portion 302 that moves relative to the first portion and is hingedly connected to the lower edge of the tailgate.

The first portion 301 is stationary by being securely fastened to the vehicle for example by attachment members 303 that may be strips of metal and/or plastics material fastened as by welding, studs and/or bolt and nut units and the second portion is movable relative thereto. The second portion 302 has a cross member 304 rigidly secured to the free outer end thereof and this cross member is pivotally connected at its free ends by pins 305, 306 to the lower edge of the tailgate. These pins project into a recess 307 in a respective one of a pair of members 308 secured to the lower edge of or incorporated in the structure of the tail gate. The assembly of pins 305, 306 into recesses 307 provide a hinge 330 type of connection to the tailgate 110. For ease of assembly/disassembly the pins may be spring loaded and biased for example in a direction toward the receiving recess.

FIG. 2 shows an embodiment employing a screw drive unit 315 outlined in the following description. The portion 302 has an external thread 303 mating with internal threads in a hole through a gear 310. The gear 310 is located between suitably mounted end thrust bearings 311 that engage opposite faces thereof. An electric motor 312 is mounted on the vehicle, for example on the member 301, and drives (directly or though a reduction unit) a gear 313 meshing with the gear 310. The worm member 302 is extended or retracted when the motor is activated with direction of movement being depended upon the direction of rotation of the gear 310.

In the embodiment illustrated in FIGS. 3-7 the power system that moves the tailgate includes respective first and second extendable and retractable power operated devices and wherein such devices are hydraulic (or if desired pneumatic) piston cylinder units.

Figure 6:
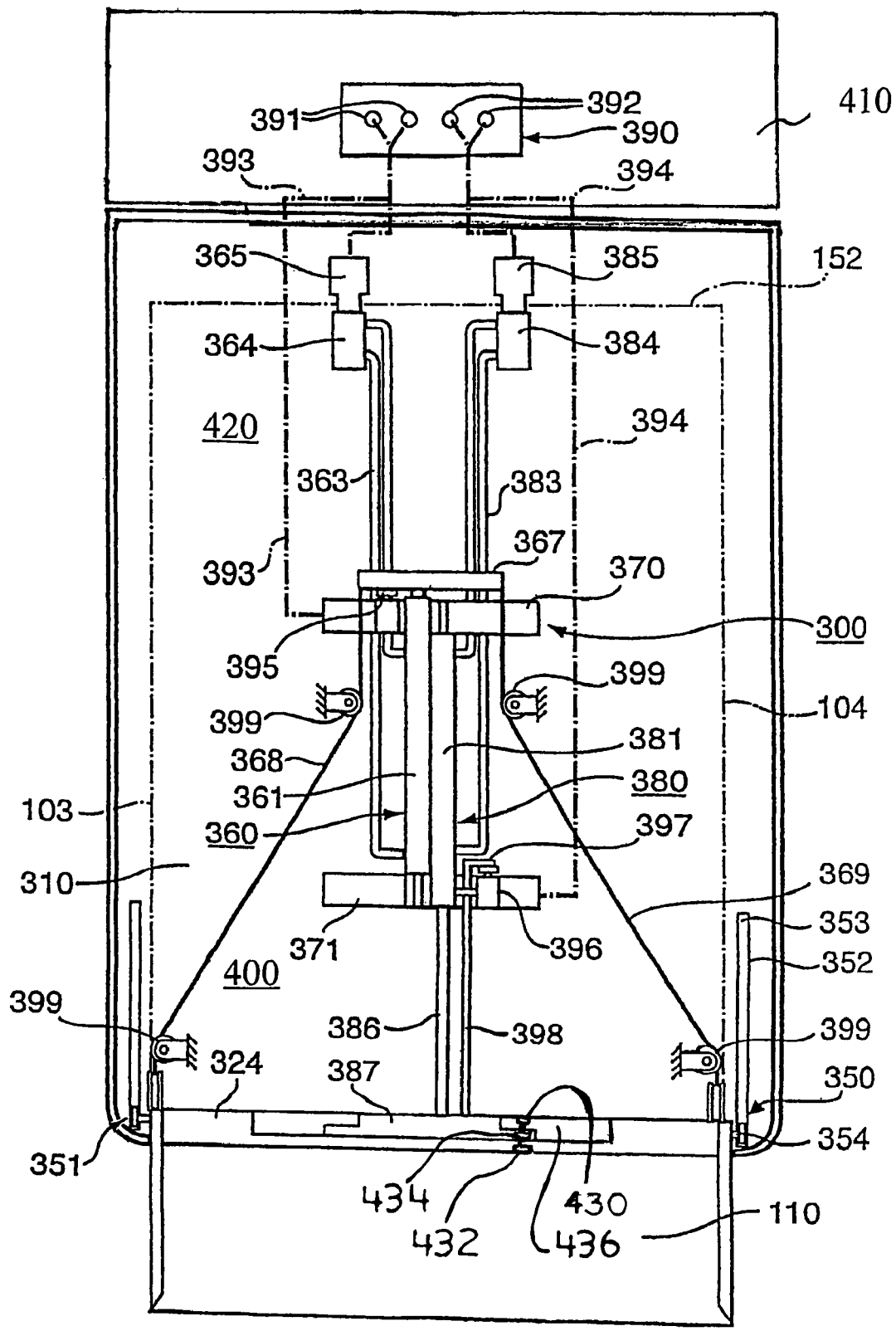
FIG. 6 is a top diagrammatic view illustrating a power system for moving the tail gate from one to the other of its various different positions depicted in respective FIGS. 3, 4, and 5 the tailgate being in the same position as depicted in FIG. 4.

Referring to FIG. 6 there is illustrated respective first and second hydraulically extendible and retractable units 360, 380. The unit 360 has a cylinder portion 361 connected in a conventional manner by hoses 363 to a hydraulic pump 364 which in turn is driven by an electric motor 365. Similarly the unit 380 has a cylinder portion 381 that is connected by hoses 383 to a hydraulic pump 384 that is driven by an electric motor 385 connected thereto. The cylinder portions 361, 381 are securely fastened in any convenient manner on the underside of the floor 101 by for example a pair of brackets 370, 371 that are spaced apart from one another longitudinally of the vehicle. Safety switches 395, 396 are located on respective mounting brackets 370, 371.

The units 360, 380 have respective piston rods 366, 386 with respective cross-heads 367 and 387 located on the free outer ends and fixedly secured thereto. The tailgate 110 is hingedly attached to the cross-head 387 as for example in the same or similar manner described in the foregoing with respect of FIGS. 1 and 2 or applicants aforementioned patent or a simple robust hinge. The hard stops limiting the arc of movement of the tailgate disclosed in the U.S. Pat. No. 6,276,738 can be omitted if so desired as this function, can be performed by limiting travel of the piston rod 366. Conversely, adjustable bolt 252 can come against rigid stop 250 to limit the arc of movement of the tailgate to a desirable angle.

The safety switch 396 is located on the bracket 371 and actuated when engaged by a lug 397 on an outer free end of a control rod 398. The control rod 398 is suitably attached at the other end to the tailgate and reciprocally moves along with the tailgate as the tailgate is moved from one to the other of its third 'retracted' position or to its second position where it projects rearwardly from the vehicle. The safety switch 395 is located on the bracket 370 and is actuated by engagement with the cross-head 367 when the piston rod 366 is in its retracted position.

A suitable control system 420 includes operator control switches and safety switches. Switches are suitably positioned for operation by the motor vehicle operator and for this purpose a control panel 390 is diagrammatically illustrated in FIG. 6 and it is preferably located in the cab 410 of the vehicle. The motor 365 is controlled by a pair of switches 391 (or the equivalent) on the control panel 390 and motor 385 by a pair of switches 392 (or the equivalent thereof). The switches 391 are operatively associated, as represented by broken line 393, with the first safety switch 395 that is responsive to a selected operative position of the piston rod of the hydraulic cylinder unit 360 and switches 392, as represented by broken line 394, with a safety switch 396 that is responsive to a selected operative position of the piston rod of the hydraulic cylinder unit 380. Both safety switches are provided to prevent binding and possible damage to the tailgate when a user may incorrectly hold the control switches 391 or 392 too long and try to over extend the tailgate or close the tailgate too tight.

Figure 7:
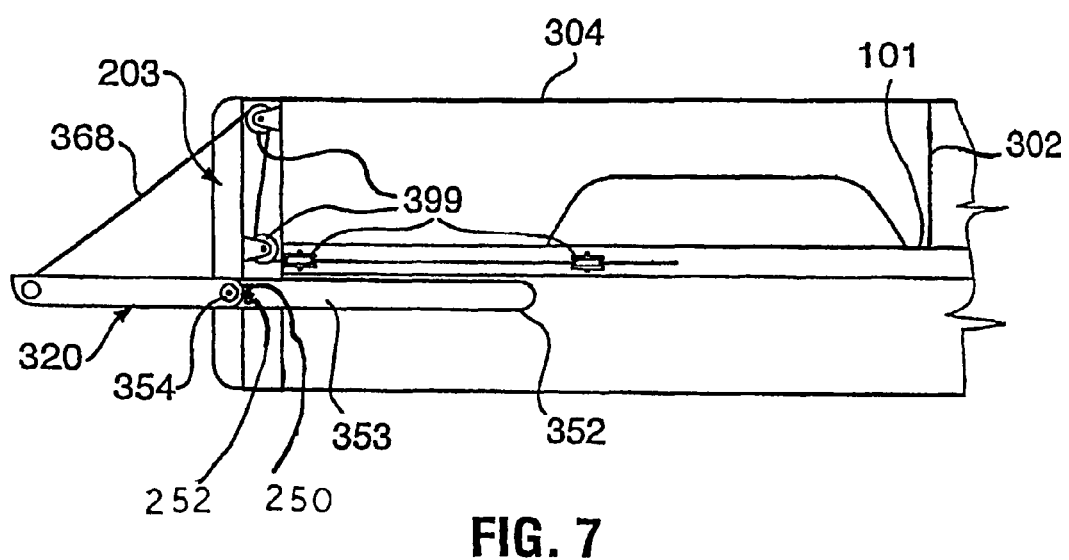
FIG. 7 is a diagrammatic partial sectional side elevational view of the box portion of the pick-up truck of FIGS. 3-6 with the tail gate in its horizontal attitude and projecting rearwardly from the vehicle as in FIGS. 4 and 6.

The power unit 360 is operatively connected to the tailgate 110 by a cable system 400 including a plurality of pulleys 399 supporting a pair of cables 368, 369 that are connected at one end thereof to the crosshead 367 and at the other end to tailgate at a position preferably proximately the upper edge thereof as best illustrated in FIG. 7. The cables are guided by a plurality of pulleys 399 appropriately positioned and jounalled on the vehicle. Some of the pulleys are located under the floor 310 while others are located on or in the respective side walls 103, 194. The pulleys are so located as to not get in the way of placing cargo in the vehicle cargo box or removing it therefrom and preferably out of sight.

Power operation of the tailgate takes place as follows. Starting with the tailgate 110 in its first, i.e., full upright 'closed' position (FIG. 3) switch 391, designated 'down' on the control panel 390, is actuated. This activates electric motor 365 driving pump 364. The piston rod 366 retracts into the cylinder 361 releasing pressure on the control cables 368, 369 that are holding the tail gate in its first, i.e., up 'closed' position preferably against the force of one or more compression springs (not shown) secured to the vehicle and engaging the tailgate. This allows the tailgate to descend via gravity 90 degrees to its second, i.e., full 'open' horizontal position with the compression springs serving as kickers to initiate movement. Limiting movement of the tailgate to an arc of 90 degrees is done by limiting the length of travel of the control cables 368, 369 and/or, if desired, by 'hard points' in the hinge connection of the piston rod crosshead 387 to the tailgate.

As the piston rod 366 in the cylinder 360 reaches its limit of travel switch 395 is activated and power is thereby removed from the 'tailgate lowering contact' of switch 391 and supplied 'tailgate retracting contact' of switch 392 on the control panel 390.

To retract the tailgate under the bed of the truck (FIG. 5) switch 392 designated 'in' is actuated. A second contact is disengaged thus cutting off electric power to the switches 391 designated as 'up' and 'down' on the control panel. This feature is preferred as it avoids accidental damage to the tailgate and/or vehicle.

As unit 380 reaches the end of it retracting stroke, the tailgate is drawn completely under the bed of the vehicle. To ensure the tailgate is properly aligned and remains stable rollers, or other guide means, can be provided on opposite end edges to the tailgate so as to engage the elongate glide bar associated therewith. Also, the piston rod of unit 380 is preferably attached to the tailgate by a heavy duty hinge means. The hinge is preferably embedded in the lower edge of the tailgate. Also, the pivot axis of the hinge is preferably in alignment with the pivot axis of the sliding pivots and maintained in alignment therewith.

Figure 4:
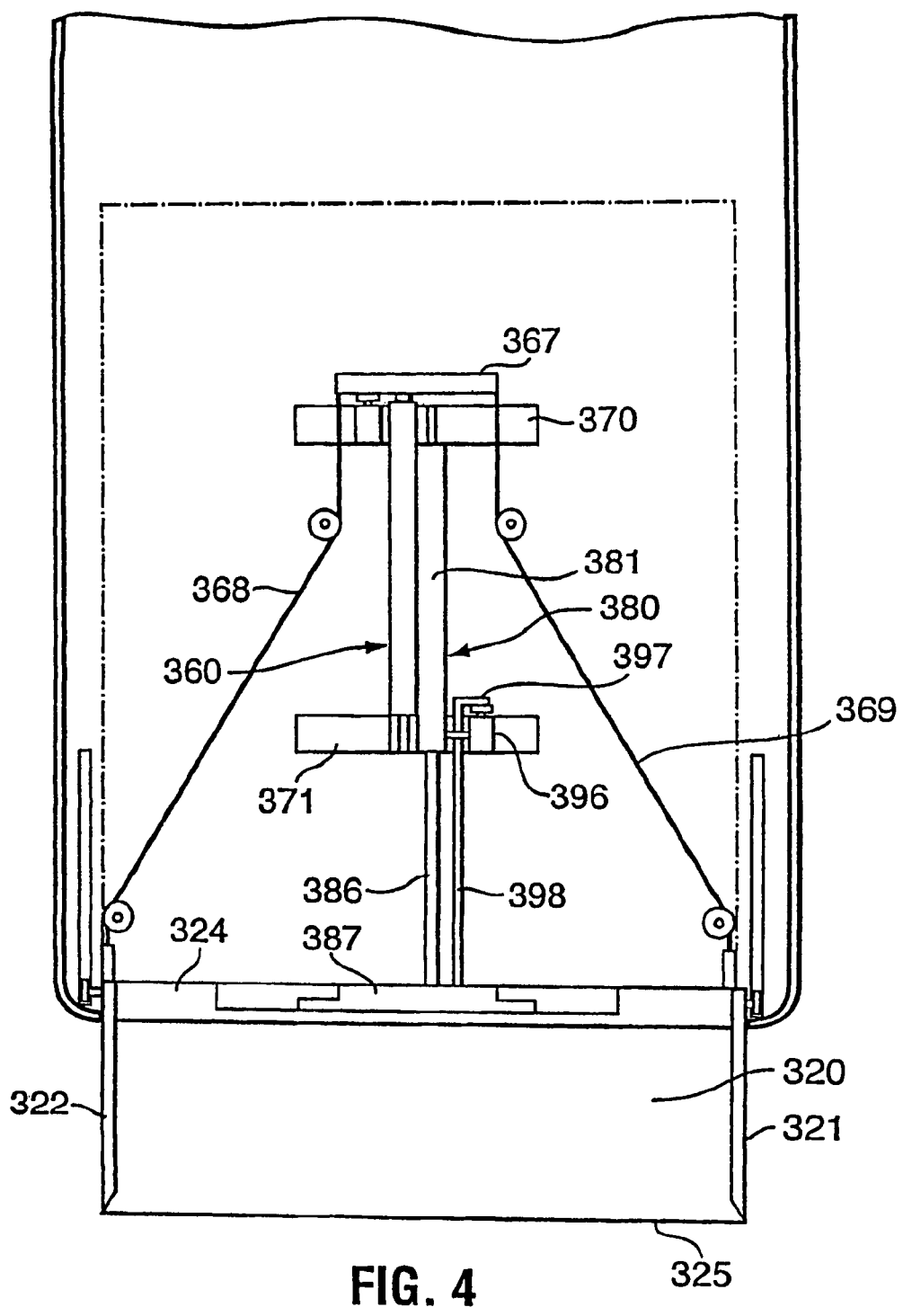
FIG. 4 is similar to FIG. 3 but with the tailgate disposed generally horizontal and projecting rearwardly from the rear of the vehicle, i.e., in an open position.
Figure 5:
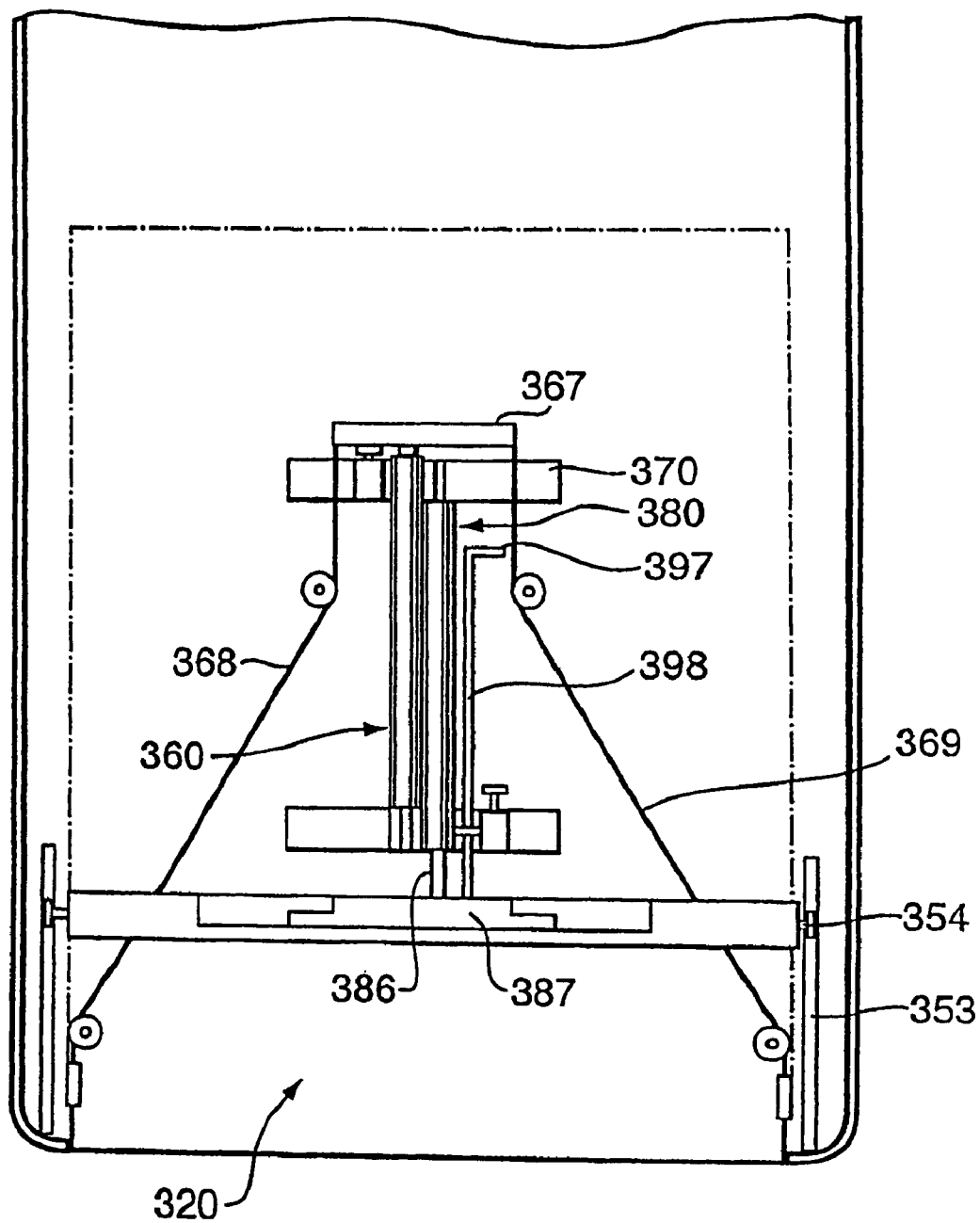
FIG. 5 is a diagrammatic top view illustrating the tailgate in a horizontal attitude and retracted so as to lie under the floor of the truck box.
Figure 8:
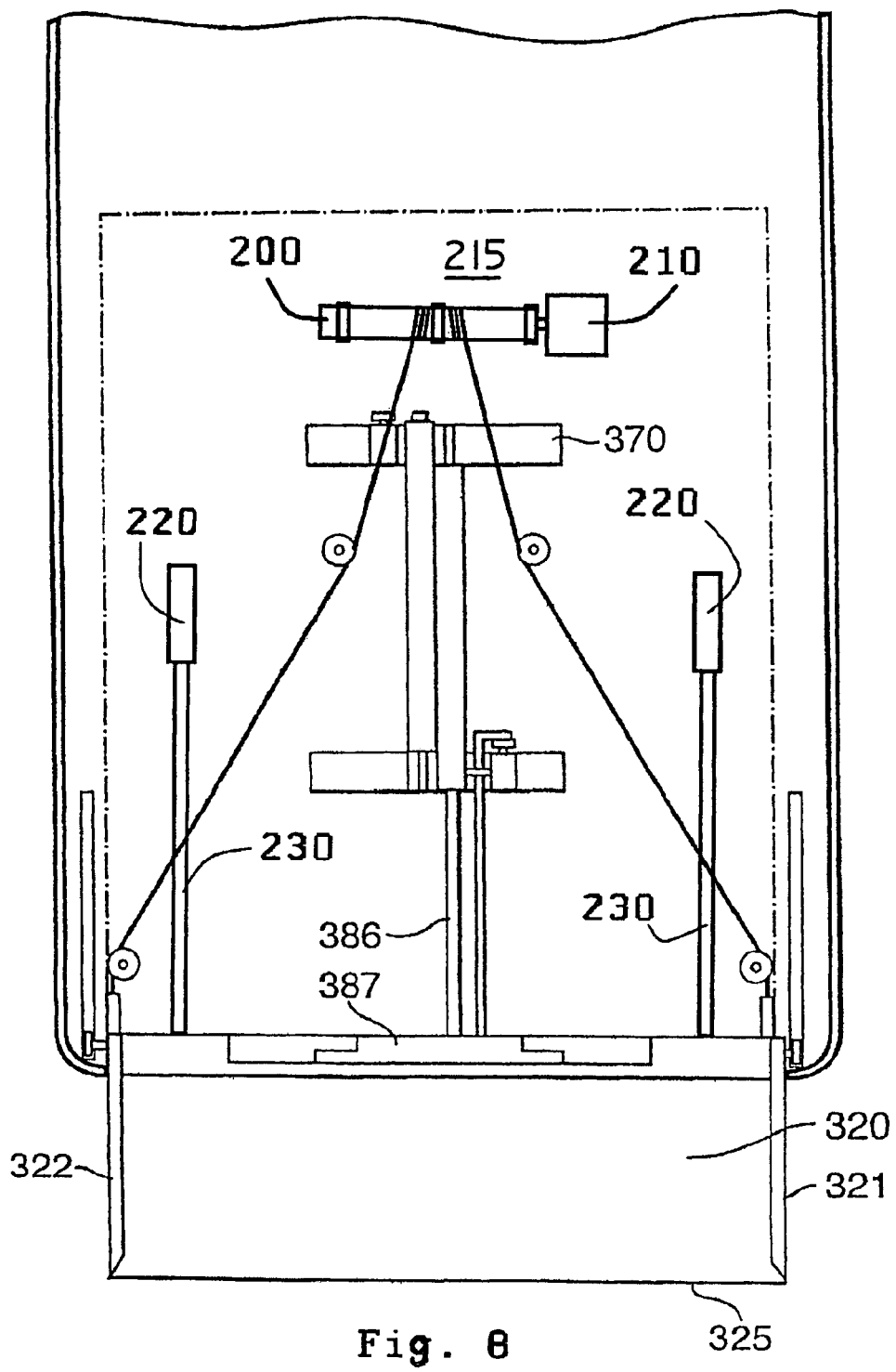
FIG. 8 is a diagrammatic top view illustrating the tailgate in a horizontal attitude projecting rearwardly from the rear of the vehicle and includes guide shafts 230 and bushings 220 for stabilizing and for minimizing binding as the tailgate is retracted and extended from under the vehicle.
Figure 9:
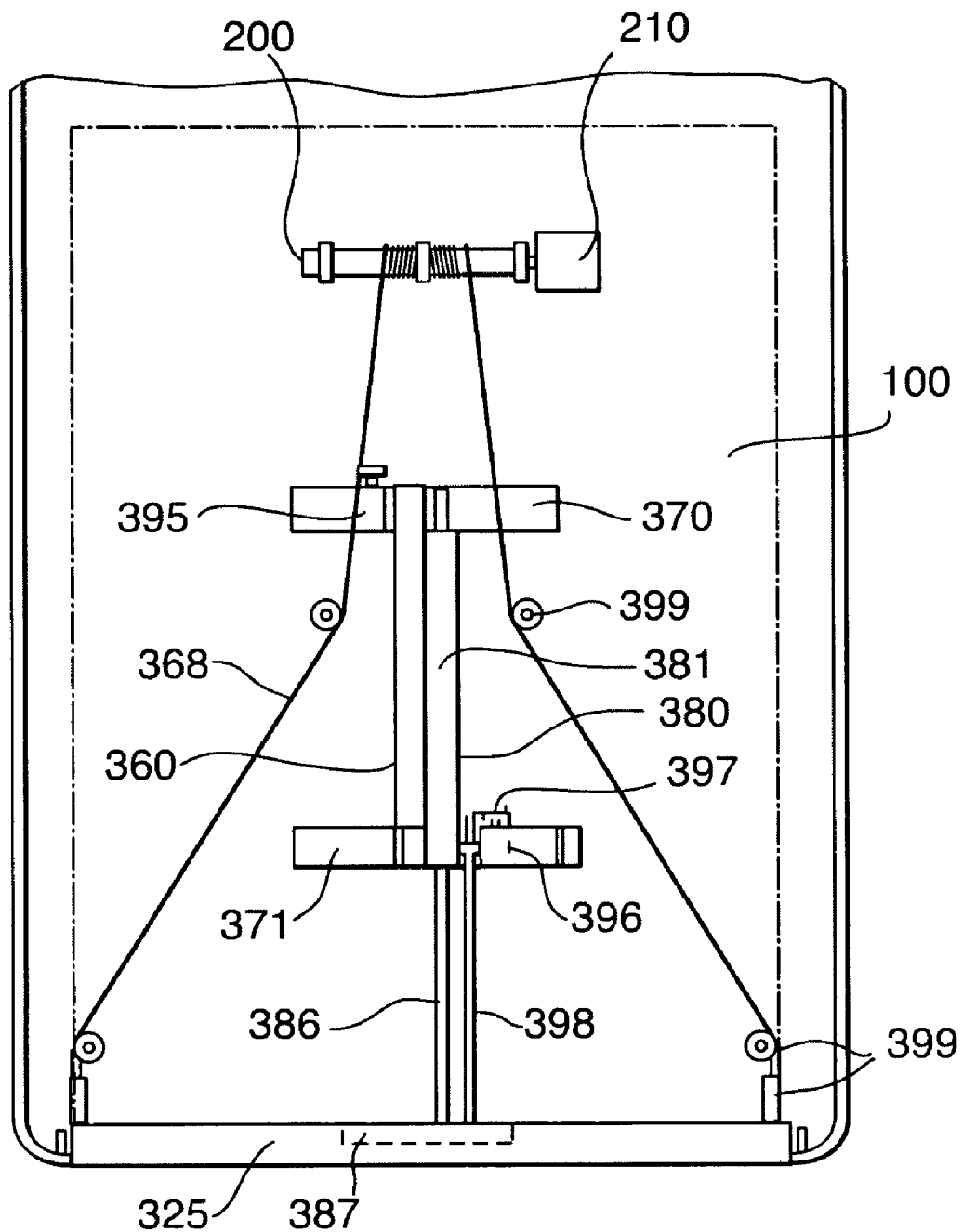
FIG. 9 is a top diagrammatic view illustrating an alternate power system for moving the tail gate from one to the other of its various different positions depicted in respective FIGS. 3, 4, and 5 the tailgate being in the same position as depicted in FIG. 4.
Figure 10:
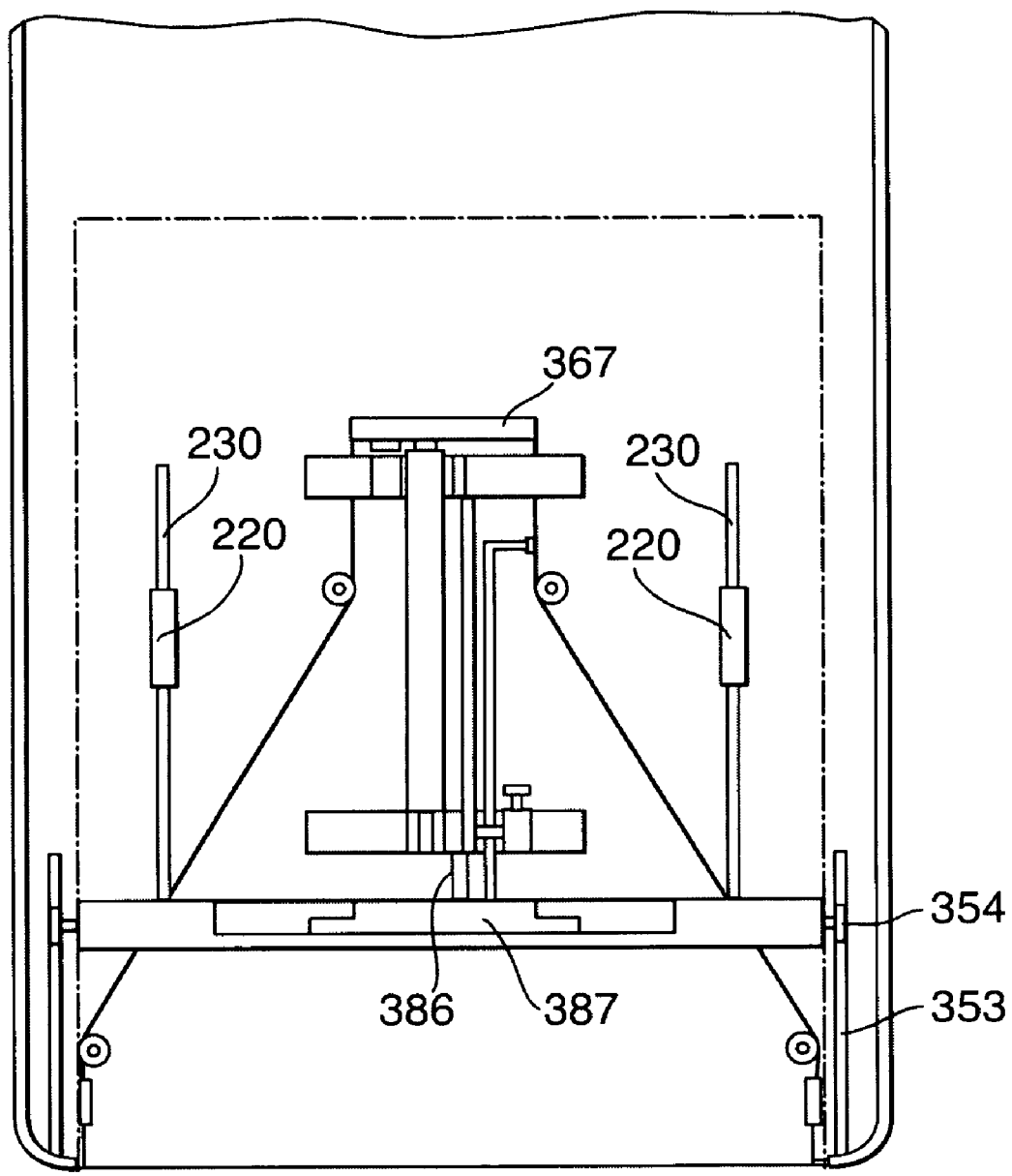
FIG. 10 is a diagrammatic top view illustrating the tailgate in a horizontal attitude retracted under the rear of the vehicle and includes guide shafts 230 and bushings 220 for stabilizing and for minimizing binding as the tailgate is retracted and extended from under the vehicle.
Figure 11:
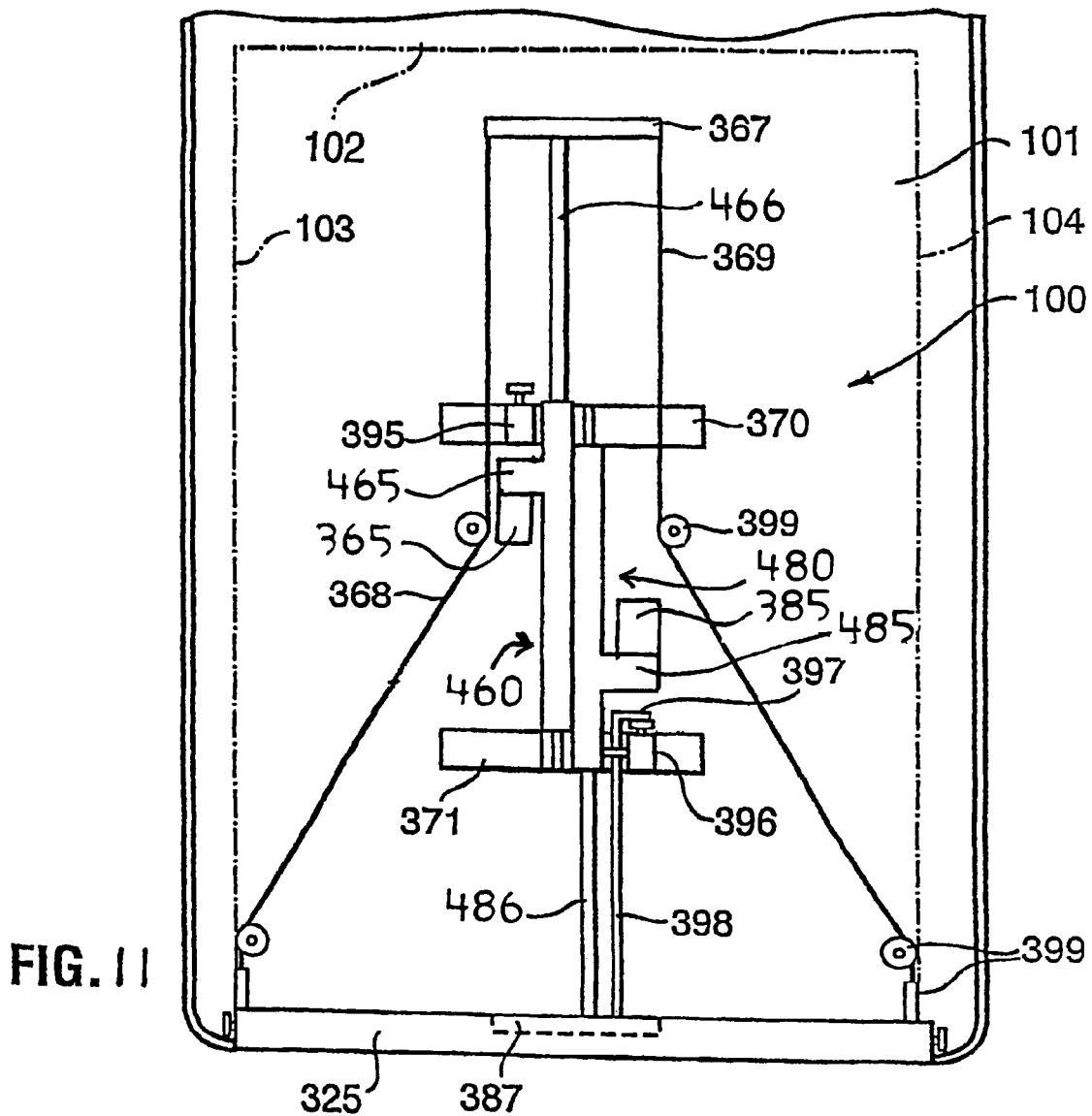

Another preferred embodiment of the present invention is shown in FIGS. 8-10. As best shown in FIG. 8, the power unit means for the cable system which opens and closes the tailgate is a winch unit comprising an electric motor 210 driving a cable drum 200 rather than the use of a screw drive or hydraulic means to control the cables 368 and 369. When the tailgate is portioned in a horizontal attitude projecting rearwardly from the rear of the vehicle guide shafts 230 and bushings 220 provide stabilization and minimize binding as the tailgate is retracted and extended from under the vehicle. FIG. 9 illustrates the alternate power system for moving the tail gate from one to the other of its various different positions depicted in respective FIGS. 3, 4, and 5 the tailgate being in the same position as depicted in FIG. 4.

FIG. 10 illustrates the tailgate in a horizontal attitude retracted under the rear of the vehicle and includes guide shafts 230 and bushings 220 for stabilizing and for minimizing binding as the tailgate is retracted and extended from under the vehicle. The rods 230 are pivotally connected at one end to the lower lateral edge of the tailgate and the free ends slide within bushing units 220 connected to the vehicle or cargo floor 101 suitably positioned and long enough to ensure that lateral movement of the tailgate is done without skewing or binding. The guide shafts 230 and bushings 220 can be utilized in any or all of the embodiments shown in FIGS. 1-10.

The 90 degree 'hard point' incorporated in the hinge assembly and rigid attachment of the end of the piston rod 386 and securement of the cylinder 381 to the vehicle prevents the tailgate from sagging and keeps it properly aligned when the tailgate is being retracted 'in' or extended 'out'. Further, with reference to FIG. 6, bushing member 387 which is attached to sliding portion 386 has a threaded nut 434 rigidly attached thereto and that nut 434 has a bolt 432 threaded therein. Bushing member 436 is rigidly attached to the bottom marginal edge of tailgate 110 and has a lug 430 rigidly attached and positioned so that when tailgate 110 is lowered to a horizontal position, the end of bolt 432 contacts lug 436 and therefore prevents tailgate 110 from lowering below a horizontal position. It can be seen that adjustment of bolt 432 in nut 434 will change the horizontal stop position of tailgate 110.

To move the tailgate, from its retracted position under the bed of the truck, switch 392, designated 'out' on the control panel, is actuated. As the tailgate reaches its fully extended second 'out' position, the safety switch 396 is activated thus supplying power to switches 391 designated 'up' and 'down' on the control panel and removing power from the 'extending out contact' of switch 392 to prevent piston 386 from trying to further extend the tailgate beyond it normal extended position.

To raise the tailgate to its first, i.e., closed position switch 391 designated 'up' is actuated. As the unit 360 starts to extend, pulling on cables 368, 369 to close the tailgate, safety switch 395 cuts off electric power to the switches 392 thereby disenabling hydraulic cylinder unit 380. This avoids accidentally damaging the power unit, tailgate and/or vehicle.

The remotely controlled retractable tailgate is a substantial improvement over the version disclosed in applicant's aforementioned patent. The retractable tailgate disclosed in the prior patent had to be manually moved from one position to another by someone positioned at the rear of the vehicle. The power operated tailgate of the present invention can be operated from inside the cab of the vehicle eliminating the need for the operator to get out of the vehicle. Also the moving parts to release the spring loaded pivot pins can be eliminated. This greatly improves the durability and reliability of the whole unit.

The retractable tailgate does not require a complicated system of rails and rollers as usually employed by the prior art because the tailgate is supported by the 'T'-shaped frame in which the stem of the "T" is extendable and retractable and anchored to the vehicle. Although the retractable tailgate preferably has actuating mechanisms incorporated within the double wall panel of conventional tailgates it is contemplated that the mechanisms could be attached to the surface of a tailgate and covered with a housing such as a sheet of metal or plastic as a retrofit system for modifying existing pickup truck tailgates.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

I claim:

1. An extendable and retractable vehicle tailgate assembly comprising:
   a tailgate;
   a pair of elongate slide members mountable in lateral spaced apart relation on a vehicle;
   sliding pivot means interconnecting opposite ends of the tailgate with a respective one of said pair of elongate slide members, said pivot means being disposed proximate a lower marginal edge of the tailgate and slidable longitudinally along said elongate slide members;
   an extendible and retractable vehicle tailgate assembly having relatively movable respective first and second portions with the first portion anchorable to the vehicle and said second portion being hingedly connected to the tailgate proximate a lower marginal edge thereof for moving said tailgate to or from a tailgate retracted position;
   power means comprising an electrically driven screw drive unit connecting to said extendible and retractable vehicle tailgate assembly and operable selectively to extend and retract the same and thereby move said tailgate back and forth longitudinally along said elongate slide members from a tailgate retracted position to a tailgate extended position;
   and a control system capable of being used to control said power means.

2. The extendable and retractable vehicle tailgate assembly as defined in claim 1 wherein said control system comprises user operated switches and safety switches and which prevent retracting of the tailgate when the tailgate is in a vertical position and prevent said power means from forcing the tailgate beyond an extended position and causing damage to the tailgate.

3. The extendable and retractable vehicle tailgate assembly as defined in claim 1 wherein control system comprises user operated switches and safety switches which prevent raising of the tailgate when the tailgate is in a retracted position and preventing said power means from forcing the tailgate beyond a closed position and causing damage to the tailgate.

4. The extendable and retractable vehicle tailgate assembly as defined in claim 1 wherein said tailgate assembly further includes at least one rod pivotally attached at one end to the lower marginal edge of the tailgate with the free end of said rod passing through said elongate slide member attached to the underside of the vehicle, said elongate slide member and rod ensuring that extending and retracting movement of the tailgate occurs without skewing or binding of the tailgate.

5. The extendable and retractable vehicle tailgate assembly as defined in claim 1 wherein said tailgate is capable of being positioned in a selected position and wherein said sliding pivot means has an adjustable stop which prevents said tailgate from being tilted below an horizontal position.

6. The extendable and retractable vehicle tailgate assembly of claim 1, said vehicle further comprising a pickup truck box portion thereof having a front end wall and a pair of laterally spaced apart side walls that extend vertically upwardly from a floor and an open rear wall, said tailgate pivotally and retractably mounting on said pickup truck box portion and located proximate said open rear wall for selectively closing and opening the same, said tailgate pivotally movable from one to the other of a first closed raised position wherein the tailgate is disposed vertically and a second open lowered position wherein the tailgate is disposed generally horizontal and projecting rearwardly from said pickup truck box portion wherein the tailgate is raised and lowered by selectively operable second power means connecting to said tailgate.

7. The extendable and retractable vehicle tailgate assembly of claim 6, wherein said selectively operable second power means comprises a powered extendable and retractable assembly having relatively movable respective first and second portions, with the first portion anchorable to the vehicle and said second portion being connected to the tailgate by a cable and pulley assembly for pivoting same on said sliding elongate pivots moving the tailgate from a horizontal position where it projects rearwardly from the vehicle to a vertical closed position.

* * * * *